United States Patent [19]

Tsukakoshi et al.

[11] Patent Number: 5,086,426
[45] Date of Patent: Feb. 4, 1992

[54] COMMUNICATION NETWORK SYSTEM HAVING A PLURALITY OF DIFFERENT POTOCAL LON'S CONNECTED THROUGH A BRIDGE

[75] Inventors: Masato Tsukakoshi, Yokohama; Yasuhiro Takahashi, Fujisawa; Matsuaki Terada, Machida; Kenji Kusaka, Hadano, all of Japan

[73] Assignee: Hitachi, Ltd., Tokyo, Japan

[21] Appl. No.: 286,847

[22] Filed: Dec. 20, 1988

[51] Int. Cl.$^5$ .................. H04J 3/02; H04J 3/26
[52] U.S. Cl. .................. 370/85.13; 370/85.14; 370/85.1; 370/94.1; 364/200; 364/240.8; 364/940.81; 364/940.62; 364/DIG. 1; 364/DIG. 2; 395/325
[58] Field of Search ... 364/200 MS File, 900 MS File; 370/95.1, 85.13, 85.7, 85.12, 38.14, 85.14; 379/289

[56] References Cited

U.S. PATENT DOCUMENTS

| | | | |
|---|---|---|---|
| 4,493,021 | 1/1985 | Agrawal et al. | 364/200 |
| 4,688,170 | 8/1987 | Waite et al. | 364/200 |
| 4,707,827 | 11/1987 | Bione et al. | 370/85.13 |
| 4,715,030 | 12/1987 | Koch et al. | 370/85.13 |
| 4,797,881 | 1/1989 | Ben-Artzi | 370/88 |
| 4,807,282 | 2/1989 | Kazan et al. | 379/284 |
| 4,809,265 | 2/1989 | Hart et al. | 370/85.13 |
| 4,811,337 | 3/1989 | Hart | 370/85.13 |
| 4,835,674 | 5/1989 | Collins et al. | 364/200 |
| 4,866,421 | 9/1989 | Szczepanek | 340/825.520 |
| 4,901,312 | 2/1990 | Hui et al. | 370/85.12 |
| 4,943,978 | 7/1990 | Rice | 370/99 |
| 5,018,133 | 5/1991 | Tsukakoshi et al. | 370/16 |

FOREIGN PATENT DOCUMENTS

| | | |
|---|---|---|
| 60-10839 | 1/1985 | Japan . |
| 60-74842 | 5/1985 | Japan . |
| 62-49748 | 9/1987 | Japan . |

Primary Examiner—Thomas C. Lee
Assistant Examiner—Mehmet Geckil
Attorney, Agent, or Firm—Antonelli, Terry, Stout & Kraus

[57] ABSTRACT

In a network system comprising a plurality of secondary LAN's of different types operable at a relatively low speed, a single primary LAN accommodating the secondary LAN's and operable at a relatively high speed, and a plurality of bridges for connecting the primary LAN and the secondary LAN's, a communication frame transmitting on the primary LAN includes an identifier representative of the type of a secondary LAN to which a source terminal belongs and a bridge receiving the primary LAN frame carries out a protocol processing on the basis of the identifier representative of the type of the secondary LAN.

13 Claims, 10 Drawing Sheets

COMMUNICATION NETWORK SYSTEM HAVING A PLURALITY OF DIFFERENT POTOCAL LON'S CONNECTED THROUGH A BRIDGE

BACKGROUND OF THE INVENTION

This invention relates to technology of interconnecting a plurality of LAN's (Local Area Networks) and more particularly to a technique for transmission of a communication frame in a network including a plurality of LAN's having different types of protocol.

Conventionally, in connection with a network system capable of performing communications between a plurality of terminals having different types of protocol, a communication method has been known and disclosed in, for example, JP-A-62-49748, according to which a protocol converter is provided between networks, and a communication frame (or a message) from one network accommodating a plurality of terminals having different types of protocol is converted by the protocol converter into a frame of common protocol which in turn is sent to the other network.

Also, JP-A-60-74842 discloses a communication method wherein in a network system comprising a network accommodating terminals applied with upper level protocol and a second network accommodating terminals applied with lower level protocol and connected to the former network through gateways, each gateway is provided with a table memory which stores the types of protocol to be applied in correspondence to addresses of all destination terminals, and each gateway determines applicable protocol by looking up the table on the basis of a destination address contained in a received frame so as to convert the protocol of the received frame.

A connection configuration of a network having a plurality of LAN's has also been known wherein a plurality of LAN's each accommodating terminals and operable at a relatively low speed (hereinafter referred to as secondary LAN's) are connected to a LAN of large capacity operable at a relatively high speed (hereinafter referred to as primary LAN) through coupling units (hereinafter referred to as bridges), and communication between a terminal belonging to a secondary LAN and another terminal belonging to a different secondary LAN is carried out through the medium of the primary LAN. When a system incorporating the technique disclosed in the aforementioned JP-A-62-49748 is applied to the above network system using the primary LAN in making an attempt to connect a plurality of secondary LAN's applied with different types of protocol to the primary LAN so as to perform communications regardless of the difference in the type of protocol, a bridge receiving a frame from an associated secondary LAN is required to convert the received frame into a frame of common protocol and transmit the converted frame to the primary LAN and conversely, when receiving a frame from the primary LAN, the bridge is required to convert the received frame into a frame of protocol of the associated secondary LAN and transmit the converted frame thereto. In this combination system, however, two types of protocol conversion i.e., conversion to the common protocol and conversion to the secondary LAN protocol are needed even in communications which are carried out between terminals of the same protocol and which does not require a protocol conversion, thereby raising a problem that the overhead is increased.

In another combination system in which the technique disclosed in the aforementioned JP-A-60-74842 is alternatively applied, a bridge receiving a frame from an associated secondary LAN decides the type of protocol used by a destination terminal by looking up a destination address contained in the received frame. To this end, each bridge is required to hold a table showing the relation between terminals and a protocol applied thereto. After recognizing the type of protocol, the bridge converts the received frame into a frame of protocol used by the destination terminal and transmits the converted frame to the primary LAN. A bridge receiving the frame subject to the protocol conversion from the primary LAN can transmit the received frame directly to an associated secondary LAN because the received frame matches the protocol of the associated secondary LAN. This combination system however presupposes that each bridge can perform protocol conversion for all of the destination terminals, and each bridge is required to hold information about all terminals in the LAN interconnecting network system, thus raising problems that the memory overhead is increased and the table management is complicated when changing terminal addresses.

Another example of a communication method in the aforementioned network using a plurality of secondary LAN's interconnected through a single primary LAN has been known as disclosed in, for example, JP-A-60-10839, according to which respective gateways (or bridges) connecting respective secondary LAN's to the primary LAN are provided with an address conversion table, and each gateway looks up the table on the basis of a destination address contained in a frame received from an associated secondary LAN to extract from the table an address of a destination bridge connecting a secondary LAN, to which a destination terminal belongs, to the primary LAN and then transmits the received frame, now including the destination bridge address, to the primary LAN. The destination bridge receives the frame from the primary LAN and removes the bridge address from that frame to produce the rest which in turn is sent to the associated secondary LAN. This communication method of JP-A-60-10839 presupposes that all of the secondary LAN's connected to the primary LAN have the same protocol, in other words, it does not consider a network in which secondary LAN's having different types of protocol coexist. Thus, in this prior art arrangement, each bridge simply adds the destination bridge address to the received frame from the associated secondary LAN or removes the destination bridge address from the frame received from the primary LAN and therefore when different types of protocol are applied to the source secondary LAN which originates the frame and the destination secondary LAN, there still remains a problem that a frame of different type of protocol interferes with a destination secondary LAN to cause an erroneous operation.

SUMMARY OF THE INVENTION

An object of this invention is to provide an improved communication system capable of performing communications between a terminal belonging to a LAN and another terminal belonging to a different LAN in a network in which a plurality of LAN's are interconnected through bridges.

Another object of this invention is to provide a communication system which, in a network having a plurality of secondary LAN's connected to a single primary LAN through associated bridges, can connect together a plurality of secondary LAN's having different types of protocol.

Still another object of this invention is to provide a communication system which can accommodate a plurality of secondary LAN's having different types of protocol and which can permit communications between desired terminals respectively connected to the secondary LAN's.

Still another object of this invention is to provide a communication system wherein a plurality of secondary LAN groups having different types of protocol are interconnected through a single primary LAN and communications can be effected steadily between secondary LAN's in a group of the same protocol regardless of the presence of another group of different protocol.

To accomplish the above objects, the present invention is featured in that in a network system having a plurality of secondary LAN's connected to a single primary LAN through associated bridges, a primary LAN frame transmitting on the primary LAN contains an identifier representative of the type of a source secondary LAN (the type of protocol applied to the secondary LAN) which originates a secondary LAN frame corresponding to the primary LAN frame. The secondary LAN identifier is added to the frame by a bridge receiving the frame from the associated source secondary LAN, the bridge being operative to relay the received frame to the primary LAN and precedently storing the identifier representative of the type of the associated secondary LAN. A bridge connected to the primary LAN and receiving the frame from the primary LAN compares the secondary LAN identifier contained in the received frame with its own secondary LAN identifier (precedently stored in each bridge) to decide whether protocol of the source secondary LAN coincides with that of a secondary LAN associated or connected with that bridge. If the types of protocol of the two secondary LAN's are decided to be coincident, the bridge extracts the secondary LAN frame from the primary LAN frame and relays the extracted secondary LAN frame to the associated secondary LAN without applying protocol conversion to the secondary LAN frame. Actually, frame relaying is permitted only when a terminal designated by a destination terminal address in the extracted secondary LAN frame exists in the secondary LAN associated with the bridge in question.

In accordance with the invention, by providing each bridge with a protocol conversion table indicative of the correspondence between the type identifier and protocol, a designation bridge receiving from the primary LAN a frame having protocol of different type can convert the protocol of the received frame into protocol of the associated destination secondary LAN, thereby permitting communications between terminals belonging to secondary LAN's of different types.

In accordance with the invention, in a network, in which a plurality of secondary LAN groups having different types of protocol are connected to the primary LAN through bridges having no protocol conversion function and communications is permitted between only secondary LAN's in a group of the same protocol, each bridge receiving a frame from the primary LAN can easily decide whether the received frame originates from a secondary LAN of the same type, thereby preventing a secondary LAN associated with the bridge in question from being troubled owing to interference with a different protocol frame.

The foregoing and other objects, advantages, manner of operation and novel features of the present invention will be understood from the following detailed description when read in connection with the accompanying drawings.

DESCRIPTION OF THE PREFERRED EMBODIMENTS

A first embodiment of the invention will now be described.

Figure 1:
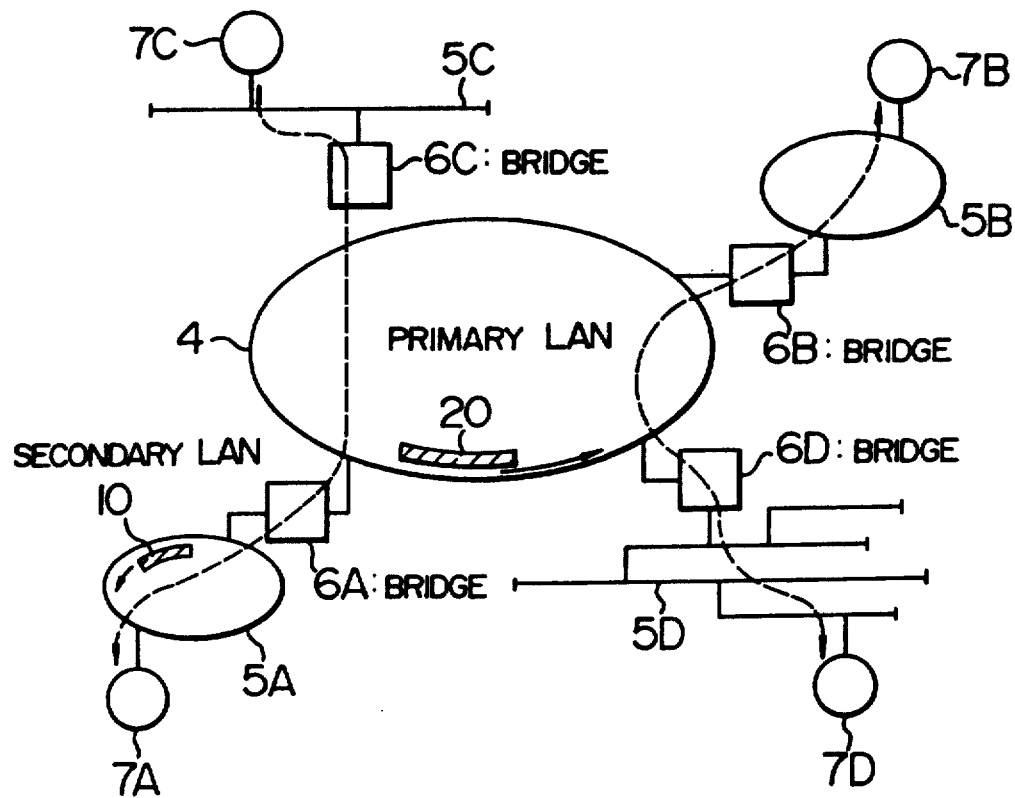
FIG. 1 is diagram illustrating an example of a network system to which the invention is applied

Referring to FIG. 1 there is illustrated an example of the construction of a hierarchical LAN system comprised of a primary LAN 4 and a plurality of secondary LAN's 5A to 5D. The secondary LAN's 5A to 5D, generically designated by reference numeral 5, are connected to the primary LAN 4 through bridges 6A to 6D, generically designated by reference numeral 6, and are also connected with terminals 7A to 7D, generically designated by reference numeral 7. As indicated at dotted-line arrows in FIG. 1, a terminal 7 at a secondary LAN is operable to also communicate with another terminal 7 of a different secondary LAN and this can be realized by providing each bridge 6 with a protocol conversion function.

When a bridge 6 receives a communication frame 20 from the primary LAN 4 and relays it to an associated secondary LAN 5 to which the bridge 6 belongs, this bridge applies protocol conversion to the communication frame 20 so as to provide a frame 10 which matches with protocol of the destined secondary LAN 5.

Figure 2:
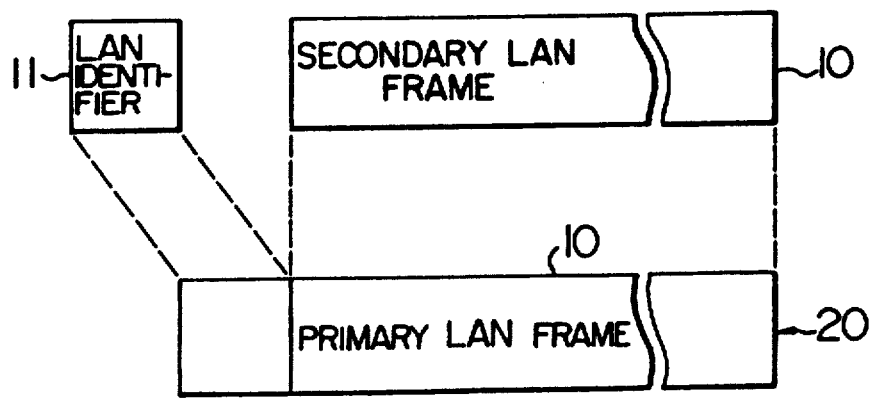
FIG. 2 shows the relation between secondary LAN frame 10 and primary LAN frame 20.

More specifically, in accordance with the invention, the communication frame on the primary LAN includes an identifier representative of the type of a source secondary LAN i.e., the type to protocol applied thereto in order to enable each bridge to decide which type of secondary LAN a frame originates from when a bridge receives that frame from the primary LAN. Precedently, an identifier representative of the type of a secondary LAN connected to the primary LAN through an associated bridge is stored in the associated bridge. For example, assuming that the secondary LAN 5A is a source LAN and the secondary LAN 5C is a destination LAN, the bridge 6A being in receipt of a frame 10 transmitted from the LAN 5A to the destined terminal 7C of LAN 5C may add, as shown in FIG. 2, an identifier 11 representative of the type of the LAN 5A, which has been stored in the bridge 6A, to the received frame 10 to prepare a frame 20 for the primary LAN and send this frame 20 to the primary LAN.

Figure 3:
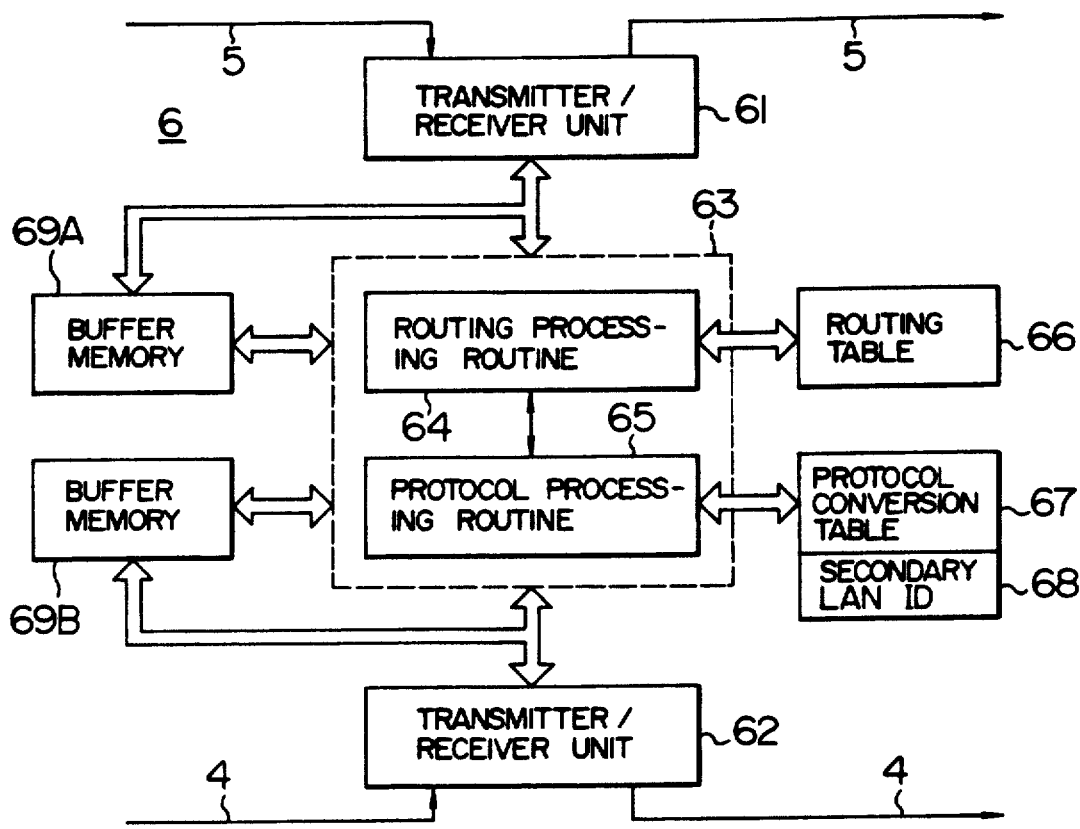
FIG. 3 is a schematic block diagram illustrating a bridge 6 through which a secondary LAN connects to the primary LAN.

The bridge 6 is constructed as diagrammatically shown in FIG. 3. Thus, the bridge 6 comprises a first transmitter/receiver unit 61 for transmitting and receiving a frame signal to and from the secondary LAN 5, a second transmitter/receiver unit 62 for transmitting and receiving a frame signal to and from the primary LAN 4, buffer memories 69A and 69B provided in association with the respective transmitter/receiver units, and a microprocessor 63 operable in accordance with a frame relay control program to be described below. The frame relay control program is mainly formed of a routine including a routing processing routine 64 and a protocol processing routine 65. Reference numeral 66 designates a memory for storing a routing table looked up in the routing processing routine, 67 a protocol conversion table looked up in the protocol processing routine 65, and 68 a memory for storing a secondary LAN identifier representative of the type of an associated secondary LAN 5 (the type of protocol) connected to the bridge 6 of interest.

Figure 4:
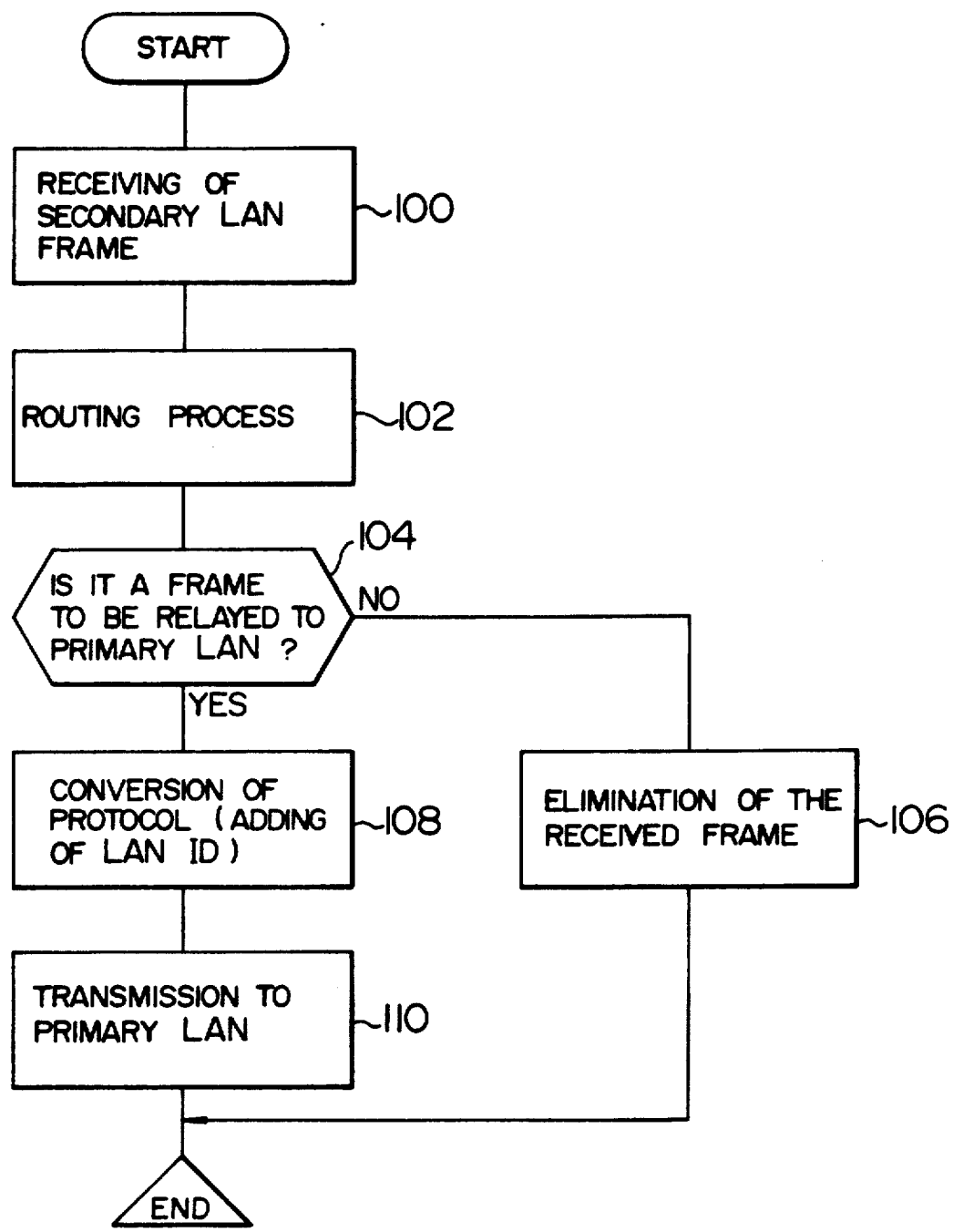
FIG. 4 is a flow chart of a program for control of a frame relay from secondary LAN to primary LAN.

FIG. 4 shows a flow chart illustrative of a frame relay program for a frame relay from secondary LAN 5 to primary LAN 4.

When a secondary LAN frame 10 is received by the buffer memory 69A through the first transmitter/receiver unit 61 of the bridge in question (step 100), the routine 64 looks up the routing table stored in the memory 66 to carry out a routing processing (step 102). Stored in the routing table are addresses of a plurality of terminals accommodated in the secondary LAN 5 connected to this bridge. The routing processing routine 64 checks whether a destination address contained in the received frame 10 is registered in the routing table. If registered, the received frame is decided not to be relayed to the primary LAN 4 (step 104) and is then eliminated (step 106). Since in the secondary LAN 5 the communication frame is relayed in the downstream direction, this frame is sent to a destined terminal connected to this secondary LAN. If the destination address in the received frame is not registered in the routing table, protocol conversion is carried out in accordance with the protocol processing routine 65 (step 108). In the course of the protocol conversion, a primary frame 20 as described previously is prepared using the type identifier 11 for the secondary LAN 5 stored in the memory 68. This primary frame 20 is transmitted to the primary LAN 4 through the second transmitter/receiver unit 62 (step 110).

Figure 5:
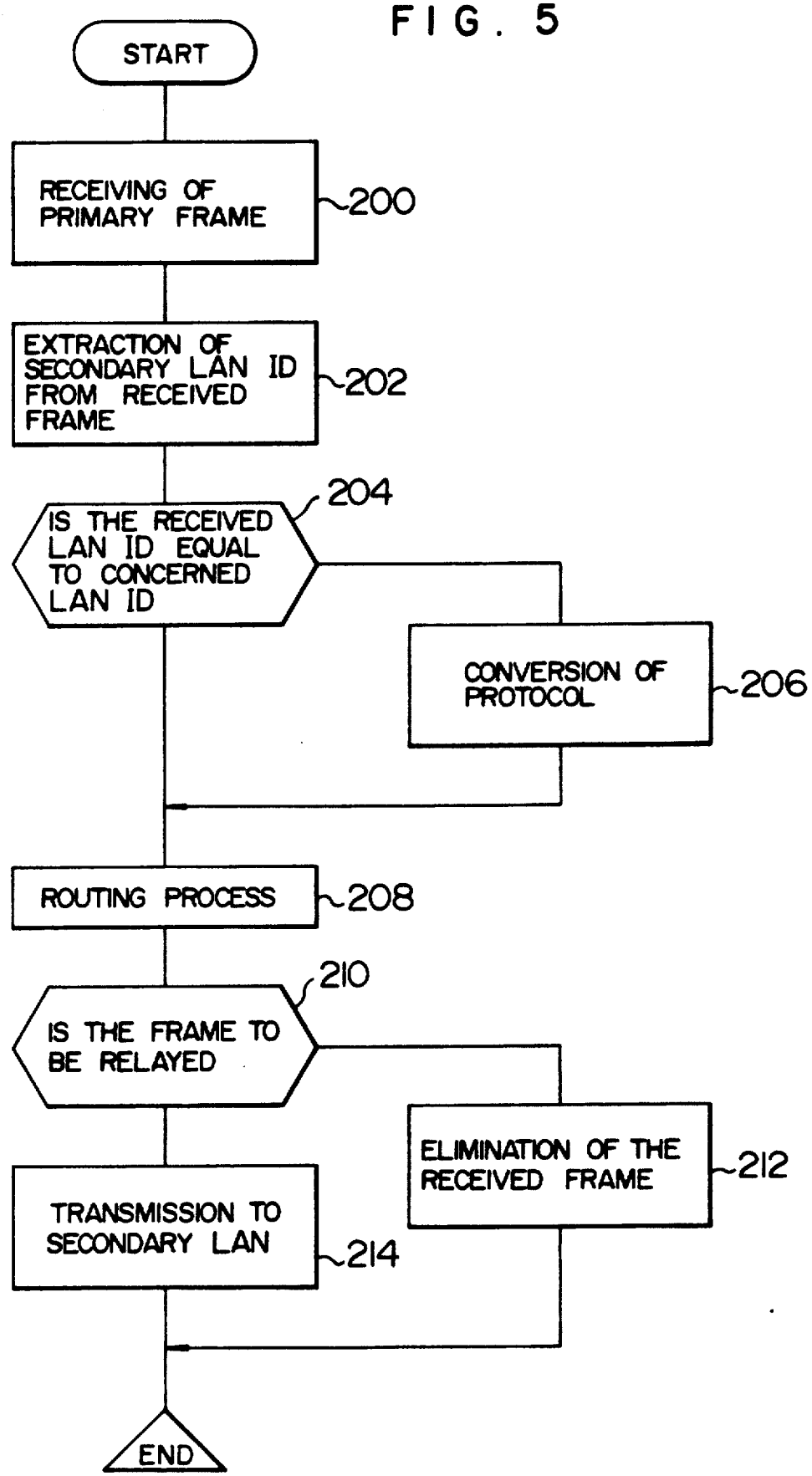
FIG. 5 is a flow chart of a program for control of a frame relay from primary LAN to secondary LAN.

FIG. 5 shows a flow chart illustrative of a frame relay operation from primary LAN 4 to secondary LAN 5. When a primary frame 20 is received by the buffer memory 69B through the second transmitter/receiver unit 62 of the bridge in question (step 200), the identifier unit 62 of the secondary LAN is extracted from the received frame (step 202) and the source secondary LAN identifier 11' contained in the received frame is compared with an identifier 11 of the associated secondary LAN stored in the memory 68 in accordance with the protocol processing routine 65 (step 204). If non-coincident, the protocol conversion table 67 is looked up to perform protocol conversion (step 206). Since frame formats corresponding to identifiers of the individual secondary LAN's are stored in the protocol conversion table 67, a format of received frame corresponding to the identifier 11' is converted into a frame format corresponding to the identifier 11 in accordance with the protocol processing routine 65. The received frame subject to protocol conversion is transferred to the routing processing routine 64 so that a destination address contained in the received frame is checked for its being registered in the routing table 66 (step 208). If the destined address is registered in the table 66, the received frame is relayed to the associated secondary LAN 5 through the first transmitter/receiver unit 61 (steps 210 and 214) but if not registered, the received frame is eliminated (step 212).

Figure 6:
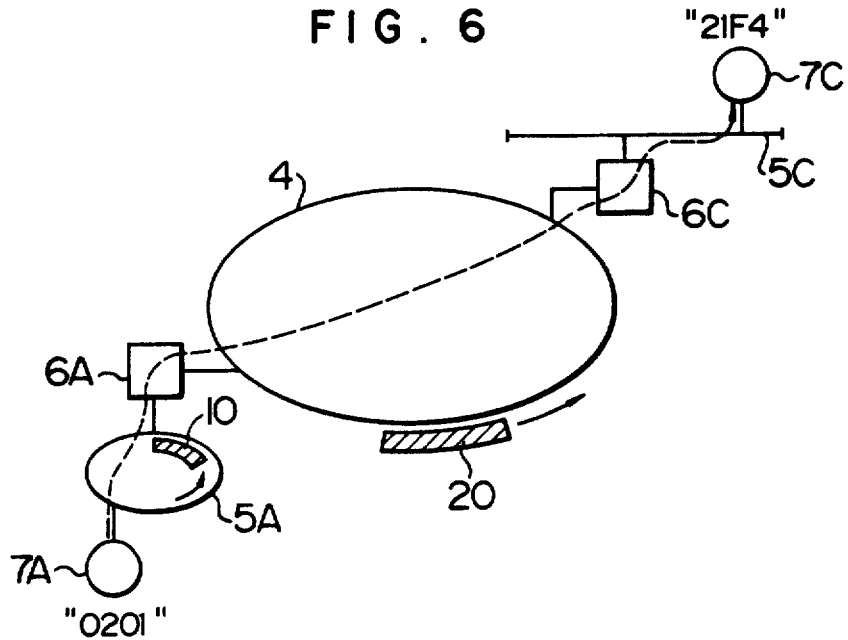
FIG. 6 is a diagram useful to specifically explain frame transmission from terminal 7A to terminal 7C in the network of FIG. 1.

When, as shown in FIG. 6, the terminal 7A connected to the secondary LAN 5A communicates with the terminal 7C connected to the secondary LAN 5C having a different protocol, the frame changes as will be described below with reference to FIGS. 7A to 7D.

Figure 7A:
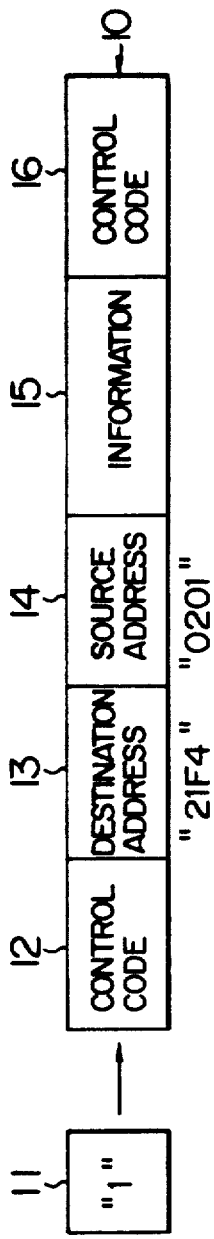
FIGS. 7A to 7D show how the frame format changes in the course of the frame transmission shown in FIG. 6.

Assume now that the terminals 7A and 7C are assigned terminal addresses "0201" and "21F4", respectively, and a frame 10 is transmitted from the terminal 7A to the terminal 7C as indicated the dotted-line arrow in FIG. 6. The frame 10 transmitted from the source terminal 7A has a format including, for example, a destination address field 13, a source address field 14 and an information field 15 which lie between two control code fields 12 and 16, as shown in FIG. 7A.

Figure 7B:
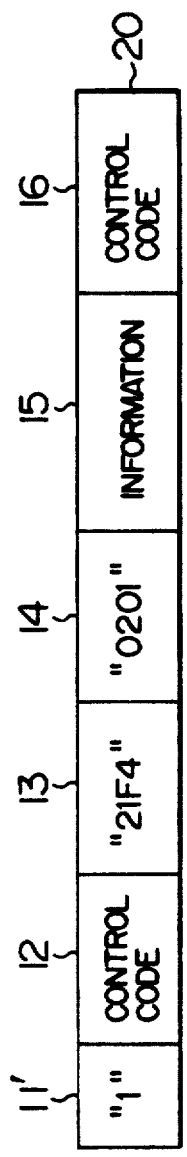
Figure 7C:
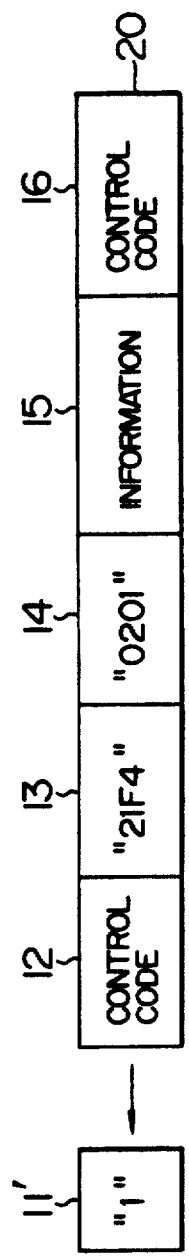
Figure 7D:
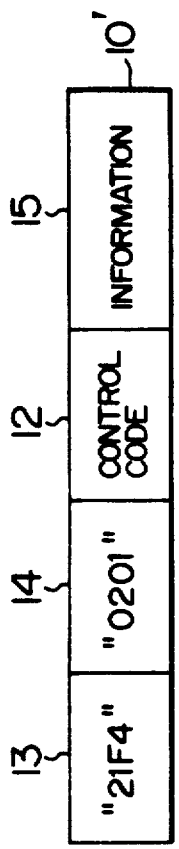

The bridge 6A receiving the frame 10 adds to this frame an identifier 11 representative of the type of protocol of the associated secondary LAN 5A (code "1" in this example) and transmits to the primary LAN 4 a primary LAN frame 20 having a format as shown in FIG. 7B. The bridge 6C being in receipt of the frame 20 from the primary LAN 4 extracts a secondary LAN identifier 11' from the received frame 20 as best seen in FIG. 7C. In this example, the secondary LAN identifier 11' differs from an identifier 11 of secondary LAN 5C stored in the bridge 6C. Accordingly, the bridge 6C converts the remainder of the frame resulting from removal of the secondary LAN identifier 11' from the received frame 20, that is, the transmission frame from the terminal 7A into a frame 10' having a format which matches with the protocol of the associated secondary LAN 5C, and then relays the frame 10' to the secondary LAN 5C. The terminal 7C connected to the secondary LAN 5C refers to the destination address 13 contained in the frame 10' to know that this frame is destined for the terminal 7C and fetches the frame 10'.

Since in accordance with the foregoing embodiment the bridge on the frame transmitting side adds an identifier representative of the type of the source LAN to a frame being transmitted to the primary LAN in order to enable the bridge on the receiving side to know, from the received frame, the type of the source secondary LAN to which the source terminal belongs, the protocol conversion can be controlled either so as not to be effected when the type of the secondary LAN to which the source terminal belongs is identical to the type of the secondary LAN to which the destination terminal belongs or so as to be effected, when the two types are different from each other, such that the protocol matches the protocol of the destination secondary LAN. Consequently, communications between a secondary LAN associated with a source terminal and another secondary LAN associated with a destination terminal can be ensured regardless of coincidence or non-coincidence of the type of the former secondary LAN with that of the latter secondary LAN.

A second embodiment of the invention will now be described.

In this second embodiment, communications can be permitted between only secondary LAN's of the same type (applied with the same protocol) among a plurality of secondary LAN's interconnected through the primary LAN.

Figure 8:
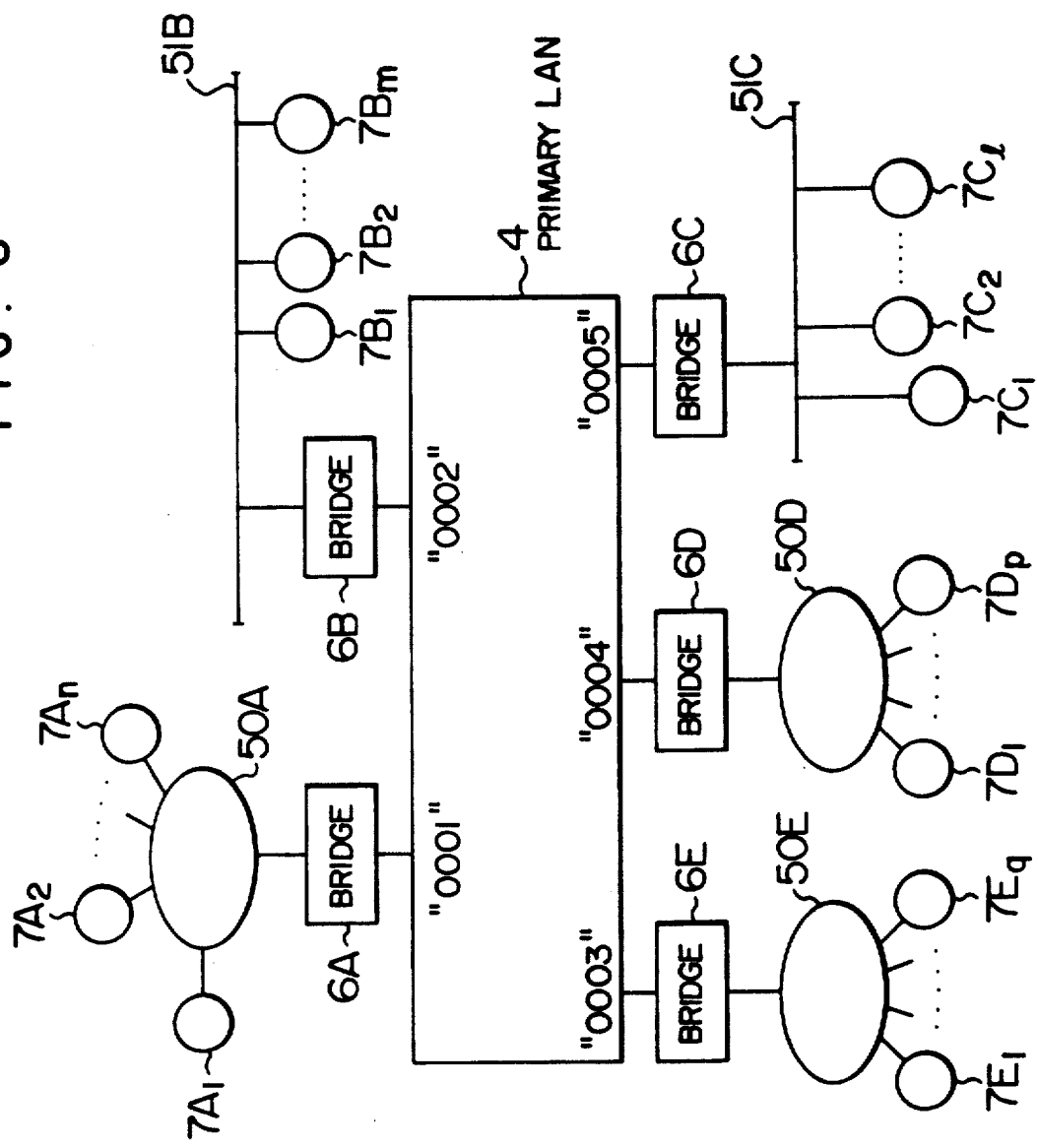
FIG. 8 is a schematic diagram illustrating a network useful in explaining a second embodiment of the invention.

Referring to FIG. 8, a network is illustrated wherein one secondary LAN group including secondary LAN's 50A, 50D and 50E, generically termed secondary LAN 50, and the other secondary LAN group including secondary LAN's 51B and 51C, generally termed secondary LAN 51, are different in type and the secondary LAN's 50A, 50D, 50E, 51B and 51C are respectively connected to a primary LAN 4 through bridges 6A, 6D, 6E, 6B and 6C, generically termed bridge 6. The respective secondary LAN's are connected with terminals $7A_1$ to $7E_q$, generically termed terminal 7.

Figure 9A:
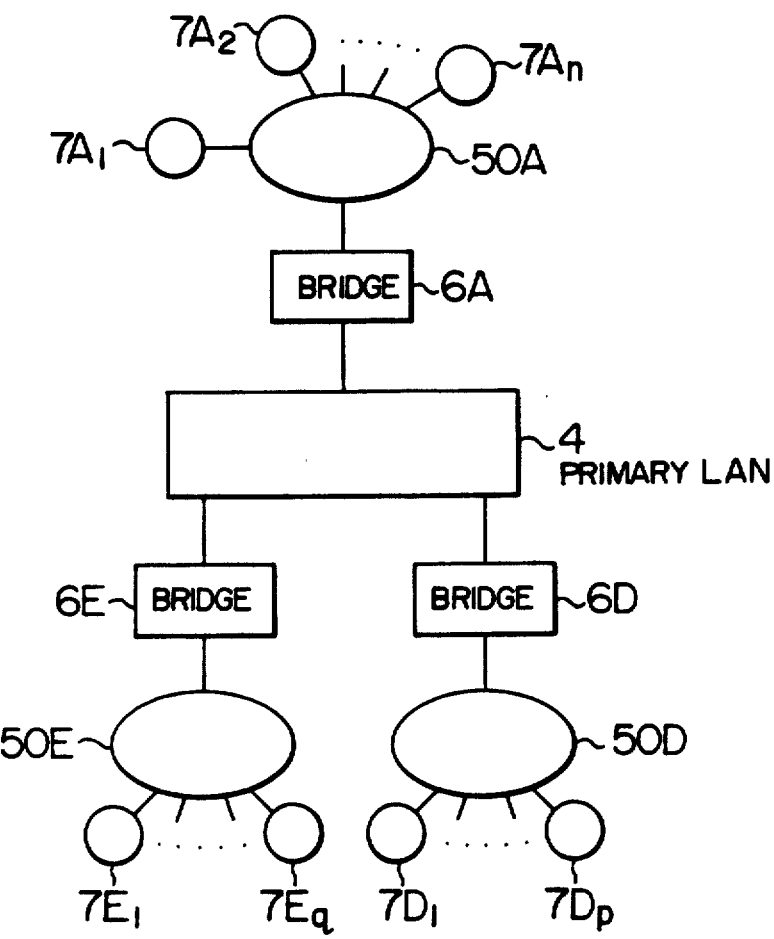
FIGS. 9A and 9B are equivalent schematic diagrams respectively illustrating first and second logically independent networks included in the FIG. 8 network.
Figure 9B:
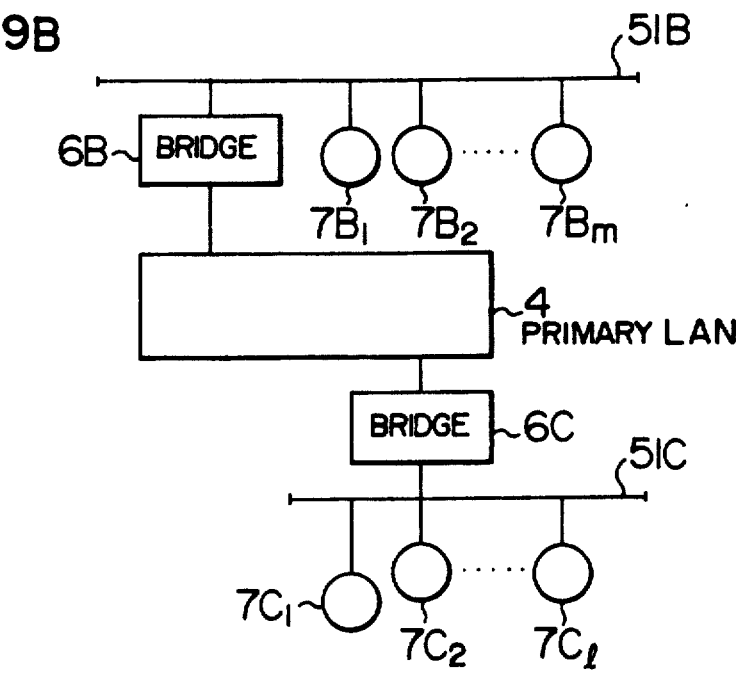

On the assumption that communications are permitted only between terminals connected to the secondary LAN's of the same type in the above network, the network shown in FIG. 8 can logically be considered as including a first network comprised of the secondary LAN's 50 (50A, 50D and 50E) and the primary LAN 4 as shown in FIG. 9A and a second network comprised of the secondary LAN's 51 (51B and 51C) and the primary LAN 4, the first and second networks being independent of each other but sharing the common primary LAN.

To actually realize first and second networks which are logically independent of each other, it is necessary to guarantee that a communication frame transmitting on the primary LAN 4 and belonging to one of the first and second networks can not be fetched into any secondary LAN constituting the other network through the associated bridge.

In the usual frame communications in which a source terminal specifies a destination terminal and then transmits a communication frame, a bridge 6 receiving the frame can look up, for example, routing information contained in the received frame or a table of correspondence between destination terminal address and destination bridge address stored in the memory 66 of the bridge as shown in FIG. 3, to determine a destination bridge address and write the determined address in the destination address field of a primary LAN frame 20, and can transmit the frame 20 to the primary LAN. In this manner, frame interference between the LAN groups of different types can be avoided.

However, in the case where the destination terminal can not be specified in the event that, for example, a frame for retrieving routing is transmitted or a frame destined for a terminal whose address has not been registered in the address correspondence table possessed by each bridge is transmitted, a bridge transmits to the primary LAN a "broadcast" frame having a destination address field in which a code signifying "broadcast" is written. Since the broadcast frame is received by all of the bridges connected to the primary LAN 4 and relayed to the respective secondary LAN's, there is a possibility that an erroneous operation occurs owing to interference of a frame transmitted from a LAN of different type.

Figure 10A:
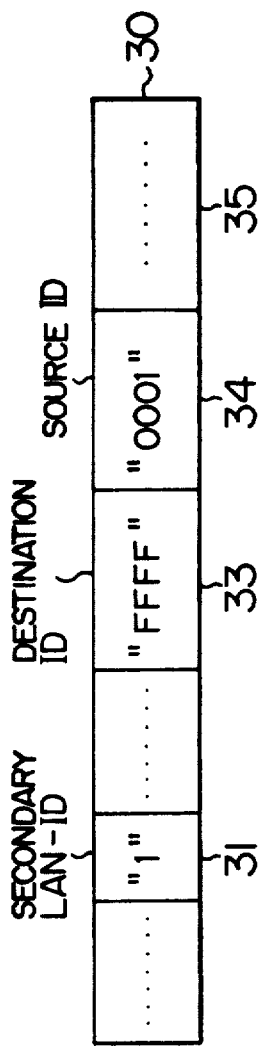
FIGS. 10A and 10B show examples of broadcast frame formats corresponding to the first and second networks, respectively.
Figure 10B:
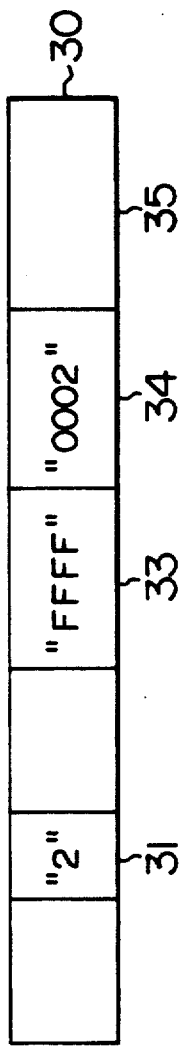

In accordance with the invention, to solve the above problem, an identifier 31 representative of the type of protocol of individual secondary LAN's is assigned to a broadcast frame 30 sent to the primary LAN 4, as shown in FIGS. 10A and 10B, and a bridge receiving the broadcast frame compares the identifier 31 with a previously stored identifier for a secondary LAN associated with this bridge to decide whether the broadcast frame should be relayed to the associated secondary LAN. In this example, the frame 30 has a destination address field 33 and a source bridge address 34 the contents of which are determined as shown in FIG. 10A, indicating that the bridge 6A having an address of "0001" has transmitted this frame to all bridges designated by the destination address equal to broadcast address "FFFF" and which belong to the first network designated by the secondary LAN identifier equalling "1". The contents of the secondary LAN frame may be described in, for example, a field 35. The broadcast frame 30 in FIG. 10B is illustrated as being transmitted from the bridge 6B having an address of "0002" and belonging to the second network designated by the secondary LAN identifier equalling "2".

Figure 11:
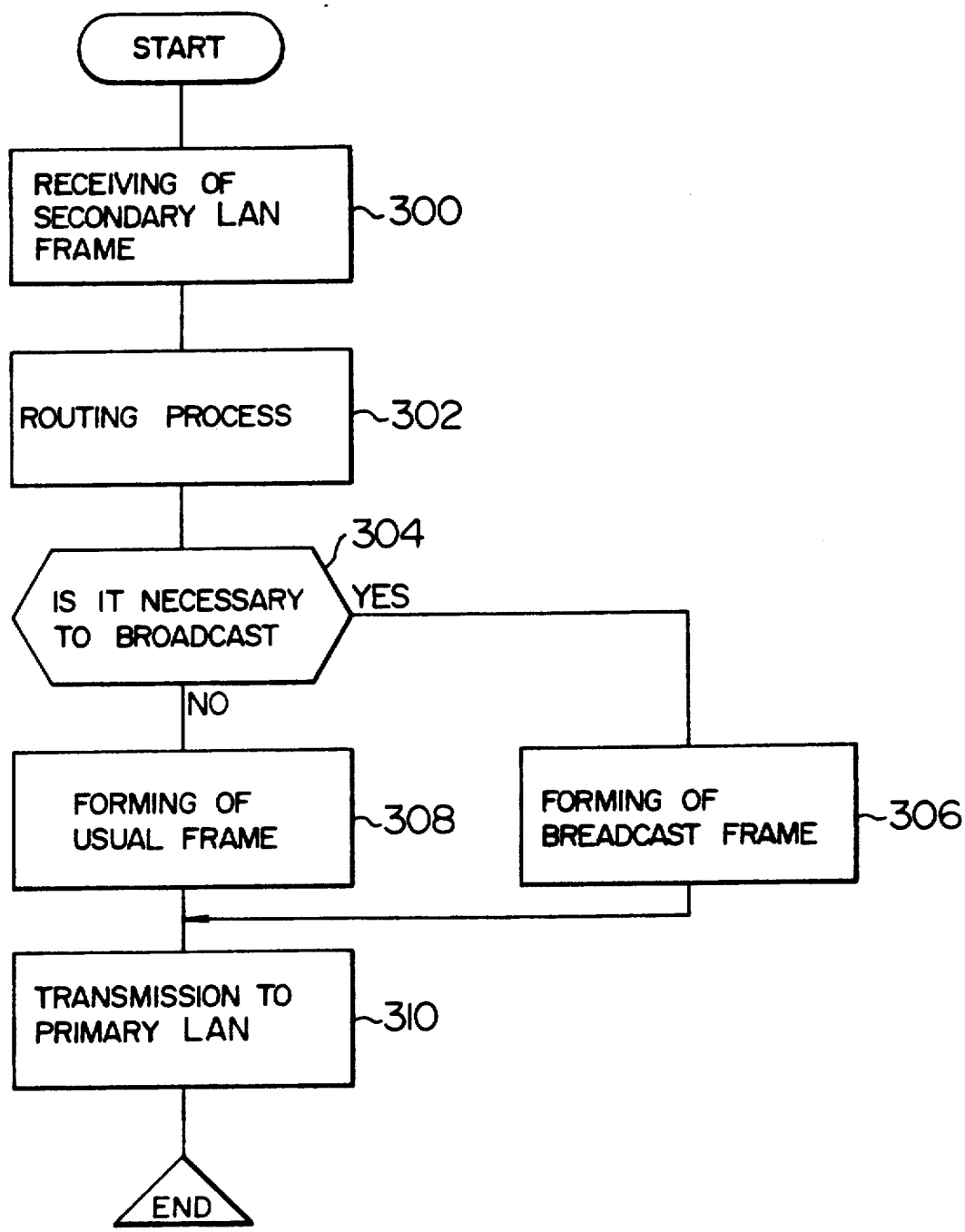
FIG. 11 is a flow chart of a program for a frame relay from secondary LAN to primary LAN executed by a bridge constituting the FIG. 8 network.
Figure 12:
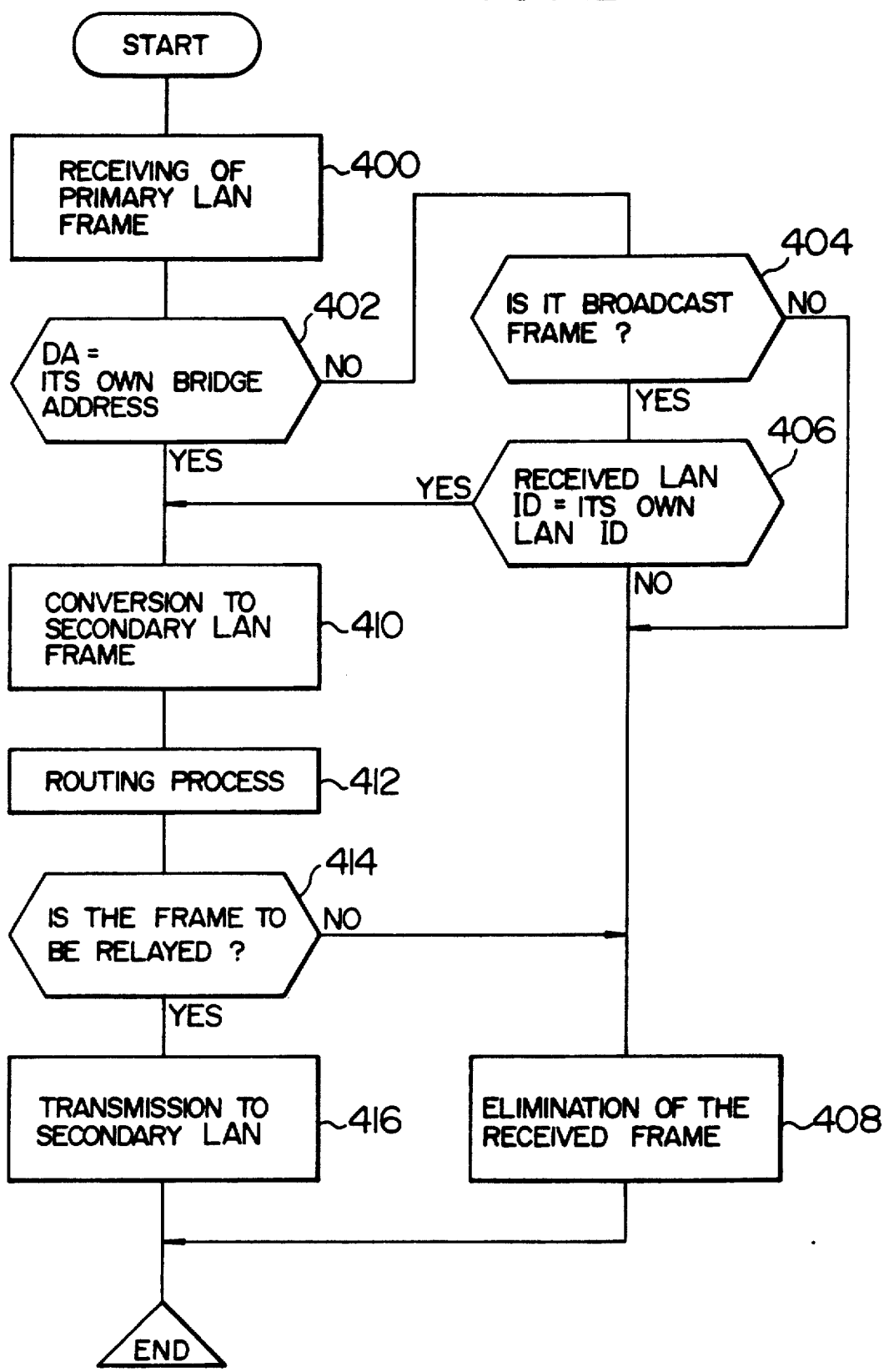
FIG. 12 is a flow chart of a program for a frame relay from primary LAN to secondary LAN executed by the bridge.

FIGS. 11 and 12 show flow charts of frame relay control programs in each bridge in the FIG. 8 network.

In particular, FIG. 11 shows a frame relay operation from the secondary LAN 5 to the primary LAN 4.

When a frame from a LAN 5(50, 51) is received (step 300), it is decided whether the frame should be relayed and a destination bridge address is determined in accordance with the routing processing (step 302). If the received frame is decided to be relayed to the primary LAN, then it is decided whether broadcast is needed (step 304). If broadcast is decided not to be necessary, the destination bridge address is added to the received frame to prepare a primary frame (step 308) and this primary frame is transmitted to the primary LAN 4 (step 310). If broadcast is decided to be necessary, a primary frame having secondary LAN identifier 31 and broadcast address 33 as shown in FIG. 10A or 10B is prepared (step 306) as this primary frame is transmitted to the primary LAN (step 310). If it is decided in the routing processing step 302 that the received frame is not required to be relayed, elimination of this received frame will be effected as in the case of the first embodiment, though not illustrated in FIG. 11.

FIG. 12 particularly shows a frame relay operation from the primary LAN 4 to the secondary LAN 5.

When a frame from the primary LAN 4 is received by a bridge (step 400), it is decided whether a destination address 33 in the received frame coincides with a bridge address of this bridge (step 402). If coincident, format conversion is effected from the primary LAN frame to a secondary LAN frame (step 410). If the destination address 33 in the received frame does not coincide with its own bridge address, it is decided whether the destination address is a broadcast address (step 404). If the answer is "No", the received frame is eliminated (step 408). If the broadcast address is determined in step 404, a secondary LAN identifier 31 in the received frame is compared with a secondary LAN identifier stored in this bridge (step 406). If coincident, the step 410 is executed and if non-coincident, the step 408 is executed Following completion of the format conversion to the secondary LAN frame in the step 410, the routing processing is carried out in step 412. For example, when the source bridge can not specify the destination bridge corresponding to the destination terminal and it transmits a frame in the form of broadcast, the routing processing is effected in each bridge receiving the broadcast frame to cause each bridge to confirm whether a destination terminal address contained in the frame belongs to a secondary LAN with which each bridge is associated. It will be noted that where a destination bridge address in the received primary LAN frame is specified for a particular destination bridge, the source bridge precedently has knowledge of existence of a destination terminal associated with the particular destination bridge and in such a case, the routing processing 412 may be omitted.

If the received frame is decided to be relayed to the secondary LAN in accordance with the routing processing (step 414), the received frame subjected to format conversion is sent to the secondary LAN 5 (step 416). If the received frame is decided not to be relayed, it is eliminated (step 408).

Figure 13A:
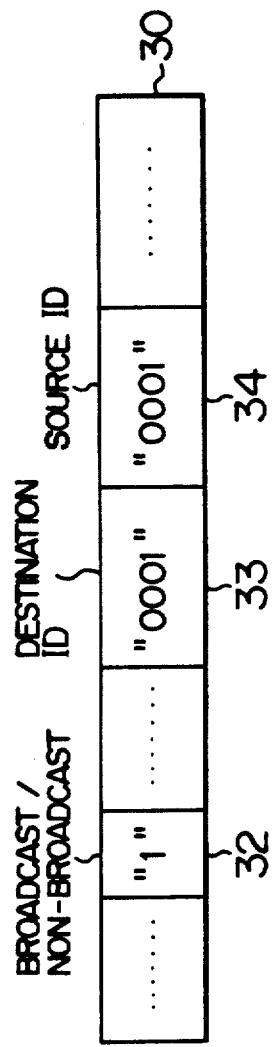
FIGS. 13A and 13B respectively show other formats of the primary LAN frame.
Figure 13B:
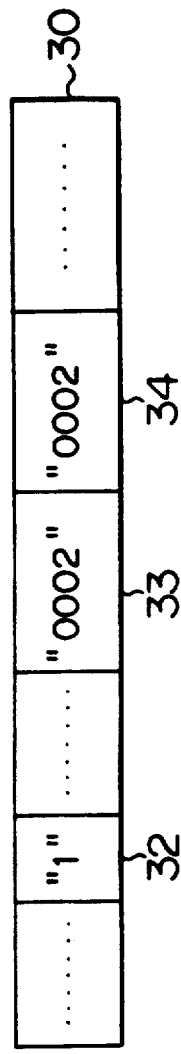

The second embodiment may exemplarily be modified such that the primary LAN frame includes a field 32 for destination between broadcast and non-broadcast as shown in FIGS. 13A and 13B. In this modification, for a broadcast frame, the field 32 is written in with a code indicative of "broadcast", for example, "1" and the destination bridge address field 33 is written in with an identification code indicative of the type of the secondary LAN, for example, "0001" representative of a secondary LAN belonging to the first network as shown in FIG. 13A or "0002" representative of a secondary LAN belonging to the second network. For a usual non-broadcast frame, the first 32 is written in with a code indicative of "non-broadcast", for example, "0" and the field 33 is written in with a destination bridge address. With this frame format employed, the destination bridge field 33 occasionally signifies the secondary LAN identifier and therefore the flow chart of FIG. 12 for relay operation of the primary LAN frame has to be changed slightly. In accordance with this slight change, when a frame is received in step 400, it is first decided whether the received frame is a broadcast frame (step 404) and if the received frame is decided not to be a broadcast frame, it is decided whether the destination address 33 coincides with its own bridge address (step 402).

We claim:

1. A communication network system having a primary local area network (LAN), a plurality of secondary LAN's each connected with a plurality of terminals, and a plurality of bridge means, each provided in association with a respective one of said secondary LAN's, for connecting the secondary LAN's to said primary LAN, said plurality of secondary LAN's each belonging to either of at least two groups having different types of protocol, a secondary LAN communication frame transmitted from a source terminal belonging to one of said secondary LAN's and addressed to a destination terminal belonging to another secondary LAN being relayed to said another secondary LAN through a bridge means connected with said one secondary LAN, said primary LAN and another bridge means connected with said another secondary LAN, each of said plurality of bridge means comprising:

first means for storing a secondary LAN identifier representative of the type of protocol required by an associated secondary LAN connected with said bridge means;

second means for converting a secondary LAN communication frame received from an associated secondary LAN into a primary LAN communication frame by combining said secondary LAN communication frame with said stored secondary LAN identifier read out from said first means and for relaying the converted frame to said primary LAN; and third means for comparing a secondary LAN identifier contained in a primary LAN communication frame received from said primary LAN with said stored secondary LAN identifier read out from said first means and for converting said received primary LAN communication frame into a secondary LAN communication frame adapted to the protocol of said associated secondary LAN through a predetermined protocol conversion procedure in accordance with a result of said comparison to relay the converted secondary LAN communication frame to said associated secondary LAN.

2. A communication network system according to claim 1 wherein said third means comprises:

memory means for storing the relations between secondary LAN identifiers and frame formats;

means for extracting a secondary LAN communication frame from said received primary LAN communication frame and for looking up said memory means to convert a format of said extracted secondary LAN communication frame into a format adapted to the protocol of said associated secondary LAN only if the result of comparison of said secondary LAN identifiers indicates non-coincidence; and means for relaying the secondary LAN communication frame extracted from said received primary LAN communication frame or the secondary LAN communication frame subject to said format conversion of said associated secondary LAN.

3. A communication network system according to claim 2 wherein said secondary LAN communication frame includes a destination address for specifying a terminal which is to receive said frame, said second means has means for checking a destination address contained in the secondary LAN communication frame received from said associated secondary LAN to decide whether said received frame should be relayed to said primary LAN, and said received frame is converted into said primary LAN communication frame when said checking means determines that said received frame should be relayed to said primary LAN.

4. A communication network system according to claim 2 wherein said secondary LAN communication frame includes a destination address for specifying a terminal which is expected to receive said frame, said third means has means for checking a destination address contained in the secondary LAN communication frame extracted from the primary LAN communication frame or the secondary LAN communication frame subject to format conversion to decide whether said received secondary LAN communication frame should be relayed to said associated secondary LAN, and said relaying means operates to relay said received frame to said associated secondary LAN only if said checking means decides that said received frame should be relayed to said associated secondary LAN.

5. A communication network system according to claim 1 wherein said secondary LAN communication frame includes a destination address for specifying a terminal which is expected to receive said frame, said second means has means for checking a destination address contained in the secondary LAN communication frame received frame said associated secondary LAN to decide whether said received frame should be relayed to said primary LAN, and said received frame is converted into said primary LAN communication frame when said checking means determines that said received frame should be relayed to said primary LAN.

6. A communication network system according to claim 1 wherein said secondary LAN communication frame includes a destination address for specifying a terminal which is expected to receive said frame, said third means has means for checking a destination address contained in the secondary LAN communication frame extracted from the primary LAN communication frame or the secondary LAN communication frame subject to format conversion to decide whether said received secondary LAN communication frame should be relayed to said associated secondary LAN, thereby to relay said received frame to said associated secondary LAN only if said checking means decides that said received frame should be relayed to said associated secondary LAN.

7. A communication network system having a primary local area network (LAN), a plurality of secondary LAN's each connected or associated with a plurality of terminals, and a plurality of bridge means, each provided in association with respective ones of said secondary LAN's, for connecting the secondary LAN's to said primary LAN, said plurality of secondary LAN's each belonging to either of at least two groups applied with different types of protocol, a secondary LAN communication frame transmitted from a source terminal belonging to one of secondary LAN's and addressed to a destination terminal belonging to another secondary LAN being relayed to said another secondary LAN through a bridge means connected with said one secondary LAN, said primary LAN and another bridge means connected with said another secondary LAN, each of said plurality of bridge means comprising:

first means for storing a secondary LAN identifier representative of the type of protocol required by an associated secondary LAN connected with said bridge means;

second means for converting a secondary LAN communication frame received from said associated secondary LAN into a primary LAN communication frame by combining said secondary LAN communication frame with said stored secondary LAN identifier read out from said first means and for relaying the converted frame to said primary LAN; and third means for comparing a secondary LAN identifier contained in primary LAN communication frame received from said primary LAN with said stored secondary LAN identifier read out from said first means to select a primary LAN communication frame containing a secondary LAN communication frame required by said associated secondary LAN and for extracting the secondary LAN communication frame from the selected primary LAN communication frame to relay the extracted secondary LAN communication frame to said associated secondary LAN.

8. A communication network system according to claim 7 wherein said secondary LAN communication frame includes a destination terminal address for specifying a terminal which is expected to receive said frame, said second means has means for checking a destination terminal address contained in the secondary LAN communication frame received from said associated secondary LAN to decide whether said received frame should be relayed to said primary LAN, and said received frame is converted into said primary LAN communication frame when said checking means determines that said received frame should be relayed to said primary LAN.

9. A communication network system according to claim 8 wherein said third means has means for checking a destination terminal address contained in a secondary LAN communication frame portion of said selected primary LAN frame to decide whether said extracted secondary LAN communication frame should be relayed to said associated secondary LAN, and said extracted secondary LAN communication frame is relayed to said associated secondary LAN only in response to the decision of said checking means.

10. A bridge system for selecting relaying communication frames between a primary local area network (LAN) with a secondary LAN accommodating a plurality of terminal devices, comprising:

first means for storing a LAN identifier representative of the type of protocol applied to an associated secondary LAN connected to said bridge system;

second means for selectively relaying, from said associated secondary LAN to said primary LAN, a secondary LAN frame addressed to one of terminal devices accommodated in the other one of secondary LAN's connected to said primary LAN in a frame form produced by adding said LAN identifier read out from said first means to said secondary LAN frame received from said associated secondary LAN; and third means for selectively relaying, from said primary LAN to said associated secondary LAN, a primary LAN frame addressed to said bridge system or one of said terminal devices accommodated in said associated secondary LAN in a form of a secondary LAN frame produced by extracting a part of said primary LAN frame received from said primary LAN if said received primary LAN frame includes a LAN identifier same as that stored in said first means.

11. A bridge system according to claim 10 further comprising a memory means for storing addresses of terminal devices accommodated to said associated secondary LAN, said second and third means checking a destination address contained in the LAN frames received from said associated secondary LAN or primary LAN by referring said memory means to judge whether or not said received LAN frame should be relayed to said primary LAN or associated secondary LAN.

12. A bridge system according to claim 10 further comprising a memory means for storing relations between LAN identifiers and frame formats, said third means having means for converting a frame format of said secondary LAN frame produced from said received primary LAN frame by referring said memory means if said received primary LAN frame includes a LAN identifier different from that stored in said first means.

13. A communication network system having a primary local area network (LAN), a plurality of secondary LAN's each accommodating a plurality of terminal devices, and a plurality of bridge means each assigned a bridge address and provided for connecting one of said secondary LAN's to said primary LAN, each of said plurality of secondary LAN's belonging to either one of plural protocol groups applied with different types of protocol, each of said bridge means comprising:

first means for storing a protocol identifier representing the type of protocol applied to an associated secondary LAN connected with said bridge means;

second means for relaying a secondary LAN frame received from said associated secondary LAN to said primary LAN in a form of primary LAN frame which includes said secondary LAN frame, a protocol identifier specified by said first means, destination bridge address, source bridge address and broadcast indicator for indicating whether or not the primary LAN frame should be received by all bridge means connected to secondary LAN's belonging to the same protocol group; and third means for selectively relaying a primary LAN frame received from said primary LAN to said associated secondary LAN in a form of said secondary LAN frame, said third means including means for checking coincidence between a protocol identifier contained in said received primary LAN frame and said protocol identifier stored in said first means, and means for extracting said secondary LAN frame from said received primary LAN frame to relay said secondary LAN frame to said associated second LAN when said checking means indicates the coincidence of two protocol identifiers.

* * * * *

UNITED STATES PATENT AND TRADEMARK OFFICE
CERTIFICATE OF CORRECTION

PATENT NO. : 5,086,426
DATED : February 4, 1992
INVENTOR(S) : TSUKAKOSHI, ET AL

It is certified that error appears in the above-identified patent and that said Letters Patent is hereby corrected as shown below:

On the Title page, items [54] and [30], please add the following: --

[54] COMMUNICATION NETWORK SYSTEM HAVING A PLURALITY OF DIFFERENT PROTOCOL LAN'S CONNECTED THROUGH A BRIDGE

[30] Foreign Application Priority Data

| 62/324114 | Japan | Dec. 23, 1987 |
| 63/85026 | Japan | Apr. 4, 1988 --. |

Signed and Sealed this

Twentieth Day of July, 1993

Attest:

MICHAEL K. KIRK

*Attesting Officer*     *Acting Commissioner of Patents and Trademarks*